No. 870,013. PATENTED NOV. 5, 1907.
A. W. BUTLER.
VEHICLE TIRE.
APPLICATION FILED DEC. 8, 1906.

3 SHEETS—SHEET 1.

Witnesses:
John H. Parker
Aline Tarr

Inventor:
Alton Webster Butler
by Macleod, Calver, Copeland & Dike
Attorneys.

No. 870,013. PATENTED NOV. 5, 1907.
A. W. BUTLER.
VEHICLE TIRE.
APPLICATION FILED DEC. 8, 1906.

3 SHEETS—SHEET 2.

Witnesses:
John H. Parker
Glenie Tarr

Inventor:
Alton Webster Butler
by Macleod, Calver, Copeland & Dike
Attorneys.

No. 870,013.  
PATENTED NOV. 5, 1907.
A. W. BUTLER.  
VEHICLE TIRE.  
APPLICATION FILED DEC. 8, 1906.
3 SHEETS—SHEET 3.
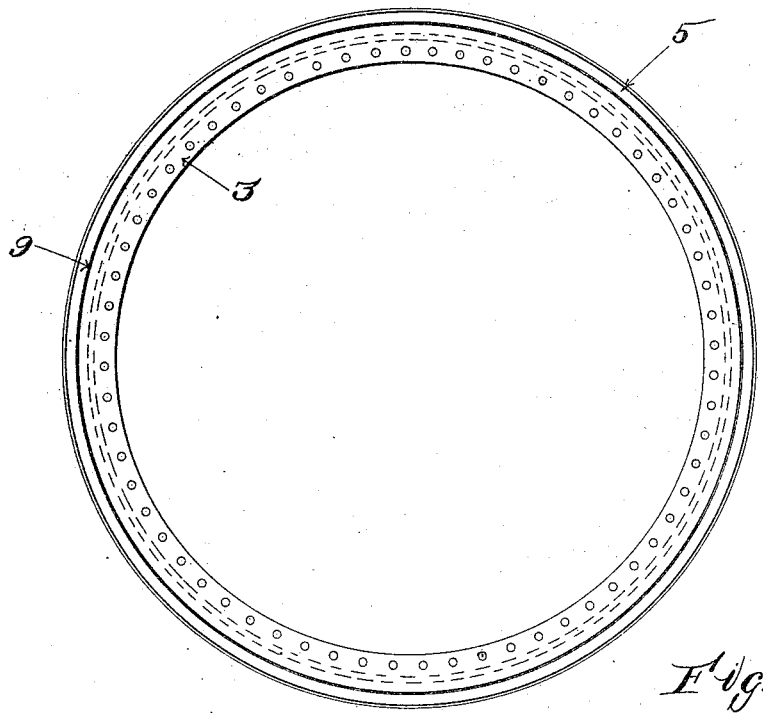
Fig. 6.
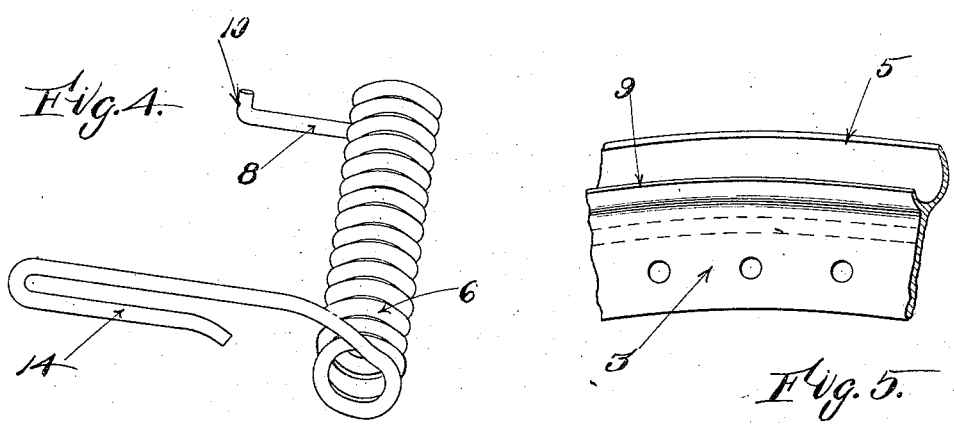
Fig. 4.  
Fig. 5.
Witnesses:  
John H. Parker  
Aline Tarr
Inventor:  
Alton Webster Butler  
by Macleod, Calver, Copeland & Dike  
Attorneys.

UNITED STATES PATENT OFFICE.

ALTON WEBSTER BUTLER, OF BROCKTON, MASSACHUSETTS.

VEHICLE-TIRE.

No. 870,013.   Specification of Letters Patent.   Patented Nov. 5, 1907.

Application filed December 8, 1906. Serial No. 346,839.

*To all whom it may concern:*

Be it known that I, ALTON WEBSTER BUTLER, a citizen of the United States, residing at Brockton, county of Plymouth, State of Massachusetts, have invented a certain new and useful Improvement in Vehicle-Tires, of which the following is a specification, reference being had therein to the accompanying drawings.

The invention relates to an improvement in vehicle tires.
The invention is especially intended for tires to be used with heavy vehicles such as automobiles in which the tire has to withstand very heavy pressure although the invention is not intended to be limited to use with vehicles of that character.
In heavy vehicles of the character mentioned, if a pneumatic tire is used, it is a very common occurrence for the tire to become punctured or to burst from some cause. Moreover, the expense of pneumatic tires of the weight and strength required for use with heavy vehicles is very great.

The cushion tire, as usually constructed heretofore, has not sufficient resiliency and is also expensive to make when composed entirely or substantially entirely of rubber.
The object of the present invention is to provide a tire of much greater resiliency than the ordinary solid cushion tire and which shall be free from the danger of puncturing to which pneumatic tires are usually subject and which shall also be much cheaper to make than either the solid rubber tire or the pneumatic tire.

The invention will be fully understood from the following description taken in connection with the accompanying drawings, and the novel features are pointed out and clearly defined in the claims at the close of the specification.

Figure 1:
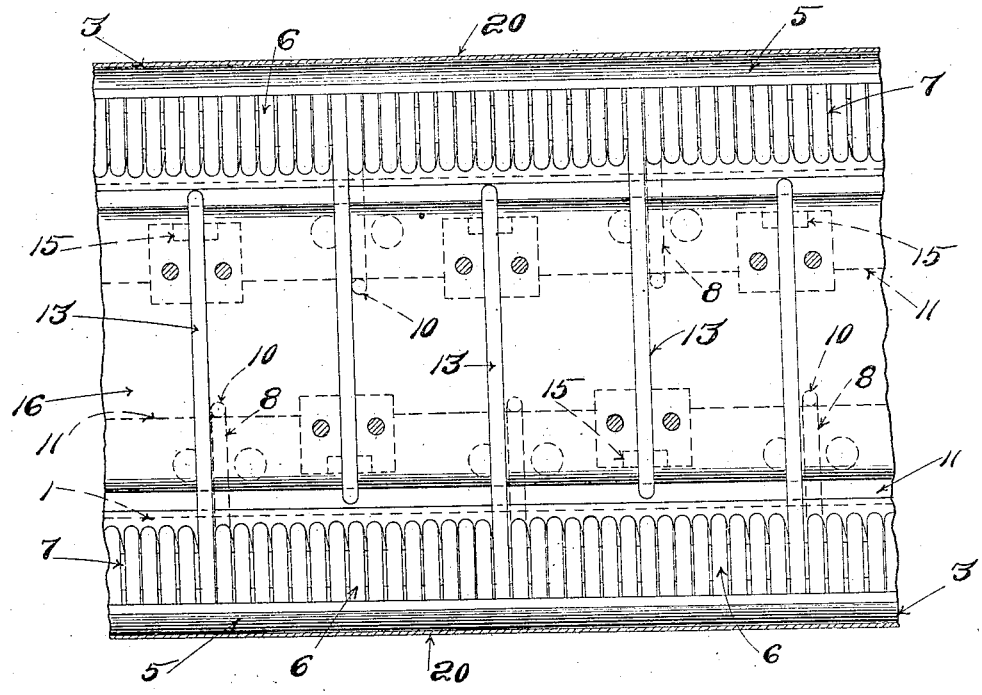
Figure 2:
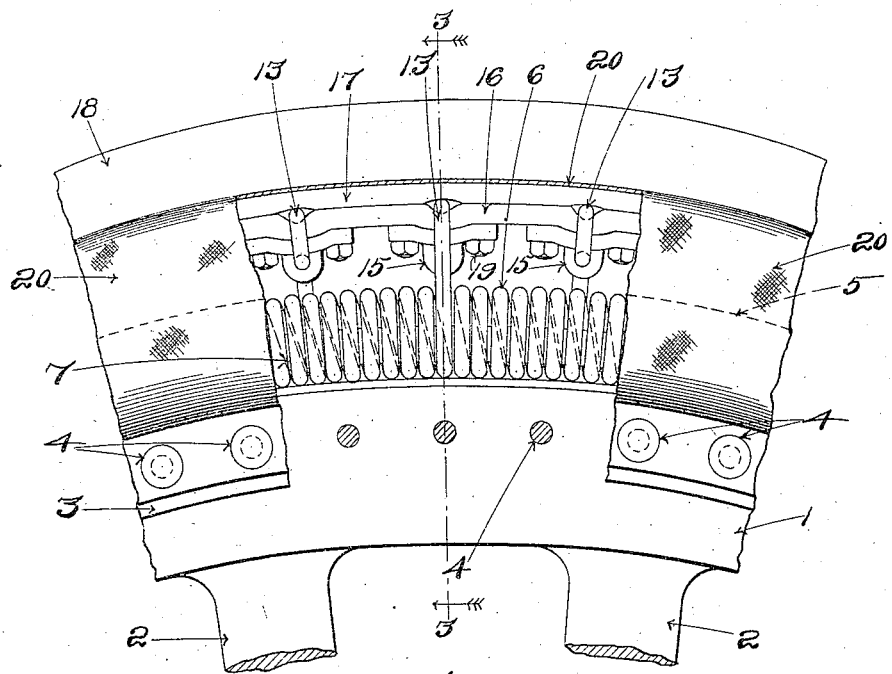
Figure 3:
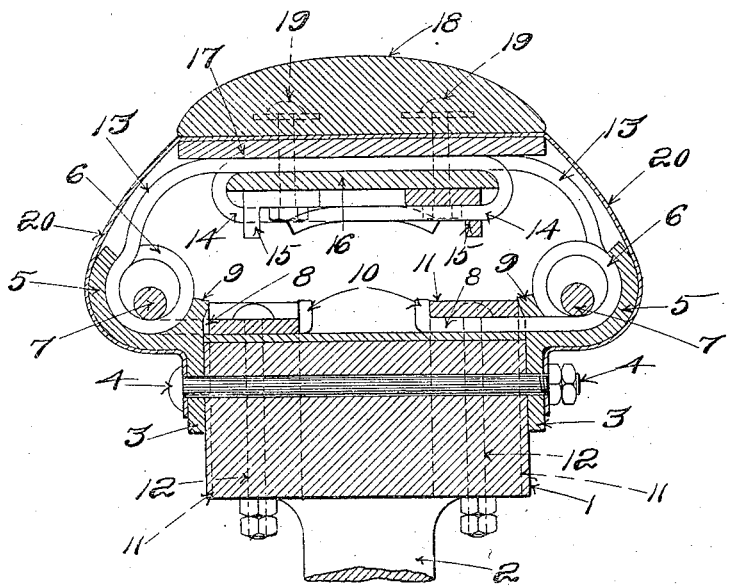

In the drawings,—Figure 1 is a plan view of a portion of a tire embodying the invention. Fig. 2 is a side elevation of a portion of a wheel with my improved tire attached, a portion of the bracket in which the spring is seated being broken away to more clearly show the spring. Fig. 3 is a cross-section on line 3—3 of Fig. 2. Fig. 4 is a detail perspective of one of the springs which form a part of the tire. Fig. 5 is a detail view of a portion of one of the annular brackets on which the springs are seated. Fig. 6 is a side elevation of one of the annular brackets.

Referring to the drawings,—1 represents the rim and 2 the spokes of a wheel which may be of ordinary construction. Secured to opposite sides of the rim 2 are annular brackets 3. Each bracket extends the entire circumference of the rim and may be secured to the rim in any suitable way, as, for instance, by bolts 4, each of which, as shown, extends entirely through the rim and through both brackets. The bolts are provided with a head at one end and screw threaded to receive a nut at the opposite end. Each bracket is provided with an outwardly extending concave flange 5 which also extends the entire circle of the rim and forms a seat for the coil springs 6. Seated on this concave flange 5 of each bracket is a series of coil springs 6 which are strung on an annular wire clamping ring 7 which holds the springs on their seat. One end of each coil spring has an extension 8 which passes through a hole in the lip 9 of the bracket 3 and extends inwardly transversely of the outer periphery of the rim 1 and rests upon the rim terminating in an upwardly turned end 10. A band 11 extends entirely around the circumference of the rim of the wheel outside of the several extension arms 8 of each series of the springs and engaging therewith, and serving as a clamp for the springs. These clamping bands 11 are bolted to the rim by a series of bolts 12. The other end of each coil spring 6 has an extension 13 which forms a bend radially outward and then extends transversely crosswise toward the other side of the rim, then a reverse bend forming an inwardly turned arm 14 which passes through a hole in a flanged ear 15 which is employed in connection with the bands 16 and 17 to secure the tread 18 to the tire. The coil springs 6 on opposite sides of the rim are so arranged that the arms 13 of the springs on one side of the rim will be in staggered relation with the corresponding arms 13 of the similar springs 6 on the other side of the rim. These arms 13 form a series of spring seats spaced at short intervals apart entirely around the periphery of the rim of the wheel transversely thereof for the tread portion 18 of the tire.

The flange 5 and lip 9 of the bracket form abutments which prevent lateral movement of the springs. If there is no lateral abutment, the springs are very liable to be displaced by sidewise movement, especially when the vehicle is going around a turn. The brackets 3 have a firm bearing against the side of the rim 1 of the wheel and thus the springs 6 have a rigid seat at the side of the wheel outside the plane of the wheel.
In order to secure the tread 18 to the tire and to form a suitable support therefor, an annular band 17 of leather or other suitable material is passed entirely around the outside of the spring arms 13 and resting thereon and drawn taut, and there is also an inner annular band 16 which passes around the wheel through the loops formed by the reversely bent arms 14 of the springs. These bands as well as the tread portion 18 of the tire are secured together in any suitable way; the preferred method being that which I have shown, by means of bolts 19; one end of each of which is embedded in the tread 18, the bolt then passing through the bands 17 and 16 and through the flanged ears 15, having a nut upon the inner end. The transverse arms 13 form the spring seat for the tread of the tire, tension being given to the springs by the coils 6. The inner band 16 fills the full width of the loops formed by the bent arms 14 and being firmly secured to the tread 18 prevents the tread from any side motion.

Preferably a covering 20 of rubber canvas or other suitable material is provided to protect the springs from dirt. The preferable manner of applying the cover is to have it pass between the tread surface 18 and the outer band 17 and have the edges brought down outside of the coil springs and secured to the side of the rim.

What I claim is:

1. A wheel having an annular flanged bracket secured to each side of the rim, a flange on each of said brackets extending laterally away from the side of the rim, a series of coil springs seated on said flanges and secured thereon, each coil spring having an arm which extends transversely of the face of the rim at some distance radially outward from the rim and a tread portion seated upon and secured to said spring arms.

2. A wheel having an annular flanged bracket secured to each side of the rim, a flange on each of said brackets extending laterally away from the side of the rim, a series of coil springs seated on said flanges and secured thereon, lateral abutments for said springs on both sides thereof, each of said springs having an arm which extends transversely of the face of the rim at some distance radially outward from the rim and a tread portion seated upon and secured to said spring arms.

3. A wheel having an annular flanged bracket secured to each side of the rim, a flange on each of said brackets extending laterally away from the side of the rim, a series of coil springs seated on said flanges and secured thereon, lateral abutments for said springs on both sides thereof, each of said springs having an arm which extends transversely of the face of the rim at some distance radially outward from the rim and a tread portion seated upon and secured to said spring arms, the said arms being formed with an inward return bend, the transverse arms of the coil springs upon one side of the arm being arranged in staggered relation with the transverse arms of the springs upon the other side, the return bends of the spring arms on one side lapping past the return bends of the spring arms upon the other side, an annular band passing through the loops formed by said spring arms and an annular band surrounding said spring arms upon the outer side thereof, said annular bands being separated from each other by said spring arms, a tread portion outside of said outer band and means for securing said tread and bands together.

4. A wheel having an annular flanged bracket secured to each side of the rim, a flange on each of said brackets extending laterally away from the side of the rim, a series of coil springs seated on said flanges and secured thereon, lateral abutments for said springs on both sides thereof, each of said springs having an arm which extends transversely of the face of the rim at some distance radially outward from the rim and a tread portion seated upon and secured to said spring arms, the said arms being formed with an inward return bend, the transverse arms of the coil springs upon one side of the arm being arranged in staggered relation with the transverse arms of the springs upon the other side, the return bends of the spring arms on one side lapping past the return bends of the spring arms upon the other side, an annular band passing through t loops formed by said spring arms and an annular band surrounding said spring arms upon the outer side thereof, said annular bands being separated from each other by said spring arms, a tread portion outside of said outer band, means for securing said tread and bands together and a protecting cover secured between the tread and the outer annular band, the edge of said cover extending around outside of the springs and secured to the rim whereby the said springs are entirely inclosed.

In testimony whereof I affix my signature, in presence of two witnesses.

ALTON WEBSTER BUTLER.

Witnesses:
WILLIAM A. COPELAND,
ALICE H. MORRISON.